United States Patent [19]
Insalaco

[11] Patent Number: 5,975,580
[45] Date of Patent: Nov. 2, 1999

[54] PROCESS MANAGEMENT SYSTEM

[76] Inventor: Anthony Insalaco, 74 Kingsbury Rd., Garden City, N.Y. 11530

[21] Appl. No.: 08/996,449

[22] Filed: Dec. 22, 1997

[51] Int. Cl.[6] .................................................. B42F 21/02
[52] U.S. Cl. .............................. 283/67; 283/56; 283/36; 283/37; 283/38; 283/39; 283/40; 283/41; 283/42; 281/38
[58] Field of Search ................................. 283/67, 56, 36, 283/37, 38, 39, 40, 41, 42; 281/38

[56] References Cited

U.S. PATENT DOCUMENTS

| 4,330,951 | 5/1982 | Hauer . |
| 4,669,754 | 6/1987 | Lálonde . |
| 4,832,374 | 5/1989 | Prest, Jr. . |
| 4,962,951 | 10/1990 | Mechesney . |
| 5,030,027 | 7/1991 | Bachrach et al. . |
| 5,366,248 | 11/1994 | Donovan et al. . |
| 5,590,911 | 1/1997 | Wilson ..................................... 283/37 |
| 5,601,432 | 2/1997 | Bergman . |
| 5,625,377 | 4/1997 | Jenson . |

OTHER PUBLICATIONS

A. Verbraeck, A Decision Support System, date–unknown pp. 207–211.

Primary Examiner—Willmon Fridie, Jr.
Assistant Examiner—Mark T. Henderson
Attorney, Agent, or Firm—Nolte, Nolte & Hunter

[57] ABSTRACT

A method of systematizing a process for a user, in which the process has steps. Each step has a corresponding tab. The user sequentially performs the steps of the process in a sequence defined by an order of tabs. One step is linked to a subsequent step. Performing the step will affect the subsequent step.

21 Claims, 8 Drawing Sheets

Illustrates the Development of an Organizer having two process-defining dividers, with each divider having two linked steps

PROCESS MANAGEMENT SYSTEM

BACKGROUND OF THE INVENTION

1. Field of the Invention

The concept of a "process" is well known. In life, processes abound. Some are natural—as in the conception, gestation and birth of a child. Some are formulated and established by individuals in their daily lives—a person preparing for the start of a workday by going through a series of steps starting with awakening and ending with arrival on the job. A Process is a collection or series of related steps.

It is advantageous that 1) a process be comprised of consecutively performable steps; 2) the instructions on how to perform a process be a part of the Process1tself; 3) that a step be capable of holding documents; and that 4) when documents are stored in or removed from or altered during a step, the resulting documents are immediately available to all physically linked steps, which may include steps of other processes The title of a step in a process should be the primary function to be performed and should preferably begin with a one-word action verb such as 'submit . . . ' or 'receive . . . ' or 'gather . . . '. Further, as a user enters a step of a process, the user should have at hand any necessary documents, accumulated from set-aside documents of predecessor steps and documents found directly in the step about to be performed. It should be pointed out that a step of a process may be devoid of documents or contain 'null' documents such that only the action provided by the step is necessary to accomplish the step. Such a step of a process might be: 'Verify that the lights are on in the warehouse'.

If the documents of a step within a process are to be used by any steps within any other related processes, it is of great value to have the steps linked, so that the documents developed by one step are readily available to other linked steps without further physical movement of developed documents. In this sense, a Process is a collection of documents—multiply titled by action verbs, each of which represents an ordered step of a Process1n which said documents are acted upon.

2. The Prior Art

Process Management often involves the development of documents. A well-established approach of prior art is to focus on the efficient collection and organization of documents for ease of accessibility by the use of organizers, while the instructions on how to process such documents are kept separate from the documents themselves. A process management system is most often comprised of two separate major pieces; 1) the apparatus or the set of devices employed to develop documents and 2) the 'how to' instructions or method(s) on how to employ the apparatus. Therefore, most often, a user must come to a process management with some prior instructional knowledge on how to perform the associated process or processes.

SUMMARY OF THE INVENTION

It is therefore the objective of the present invention to overcome the drawback of the prior art and to provide a Process Management System that: 1) has the instructions on how to perform the process built into the execution of the Process1tself; 2) establishes process steps that are consecutively ordered for ease of execution; 3) allows for the storage within process steps of developed; and 4) through a mechanism of linking steps of processes allows for the presentation of relevant documents to one step that were developed in other steps without separate retrieval by a current step. The present invention makes the process procedure an integral part of the documents that may be developed during the process and related processes that may utilize some of the same documents.

The present invention combines into a single system the method and means of managing the dispositions of documents as they move through their life-cycles under the control of a processes.

These and other related objectives are achieved according to the invention by a system that provides for performing the consecutively-ordered steps of a process and making resulting acted-upon documents readily available to subsequent linked steps comprising the same or other processes.

The embodiment chosen for invention illustration uses: 1) a standard ring binder with tabbed dividers as the organizer and 2) a student's academic day as the systematization target—having documents as the systematized documents. Additionally, an invention-illustrative example is drawn from the processes governing the document-processing activities of a teacher's academic day. Because the invention is a 'Process Management System', it is obvious that many embodiments of the invention are possible—covering many Process-based applications—without departing from the spirit and scope of the invention.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

GLOSSARY OF TERMS

Document: Comprising any materials, where a document is the symbolic representation of such materials;
Divider: A device used to separate documents for some purpose.
Step: A discrete performable event within a process having an order among all the steps belonging to the process.
Tab: A way of locating a particular divider. One divider may have more than one tab.
Process tab A tab on a divider that corresponds to a step in a Process. A step is performed by selecting a process tab.
Tab link: Two or more tabs on a divider are said to be linked.
Labeling Conventions for a
Process: Process#:"name-of-the-process" ex.: Process 1:Class-session
Step: Step#:"name-of-the-step" ex.: Step4:GATHER
Process & Step: Process#:name/Step#:name ex.: Process1:Class-session/Step4:GATHER shorthand: P#/S# or P#S# ex.: Step5,Process2 is P2/S5
Figure element Drawing-element/# ex.: Drawing-element/512

Figure 1:
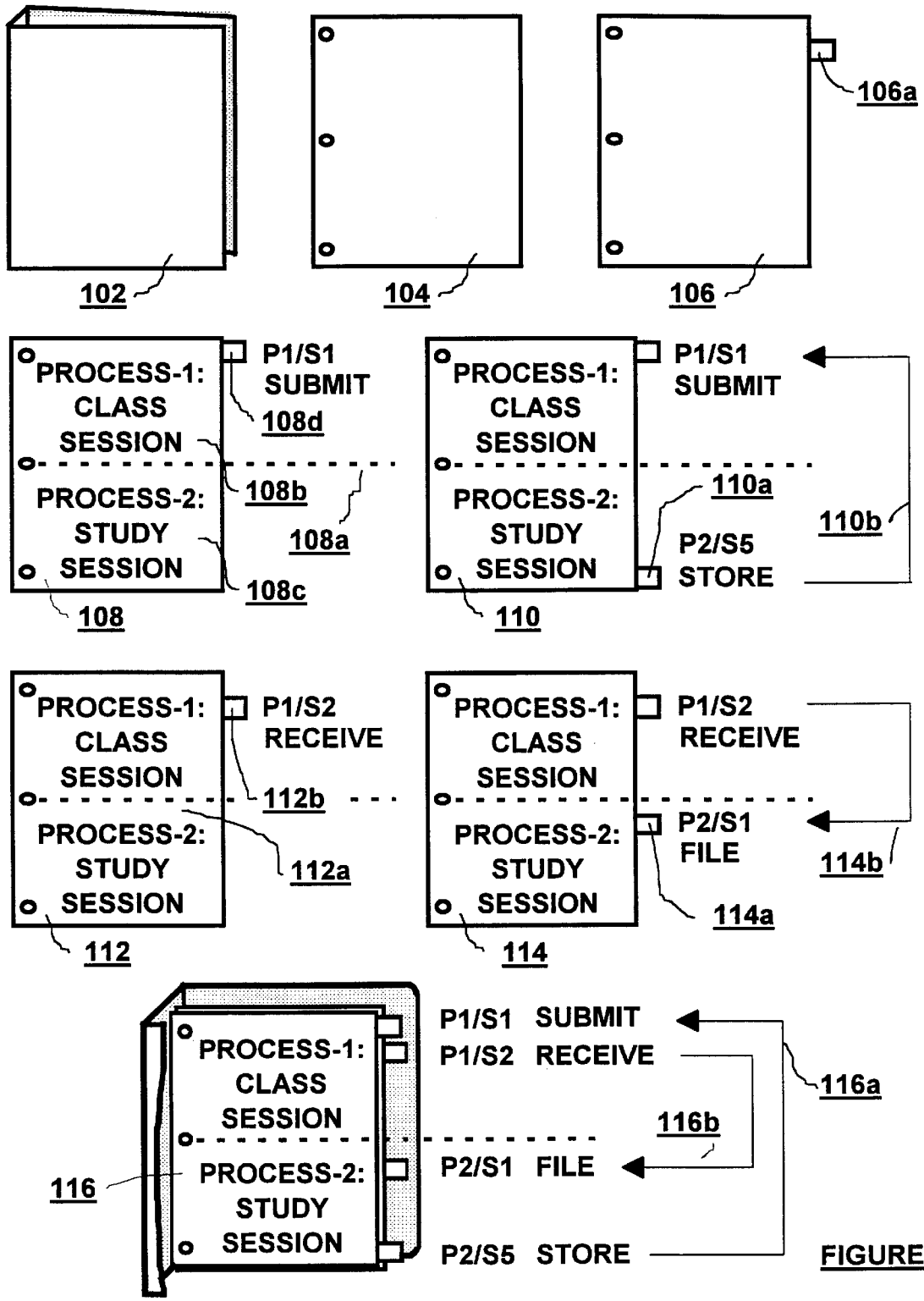
Figure 2:
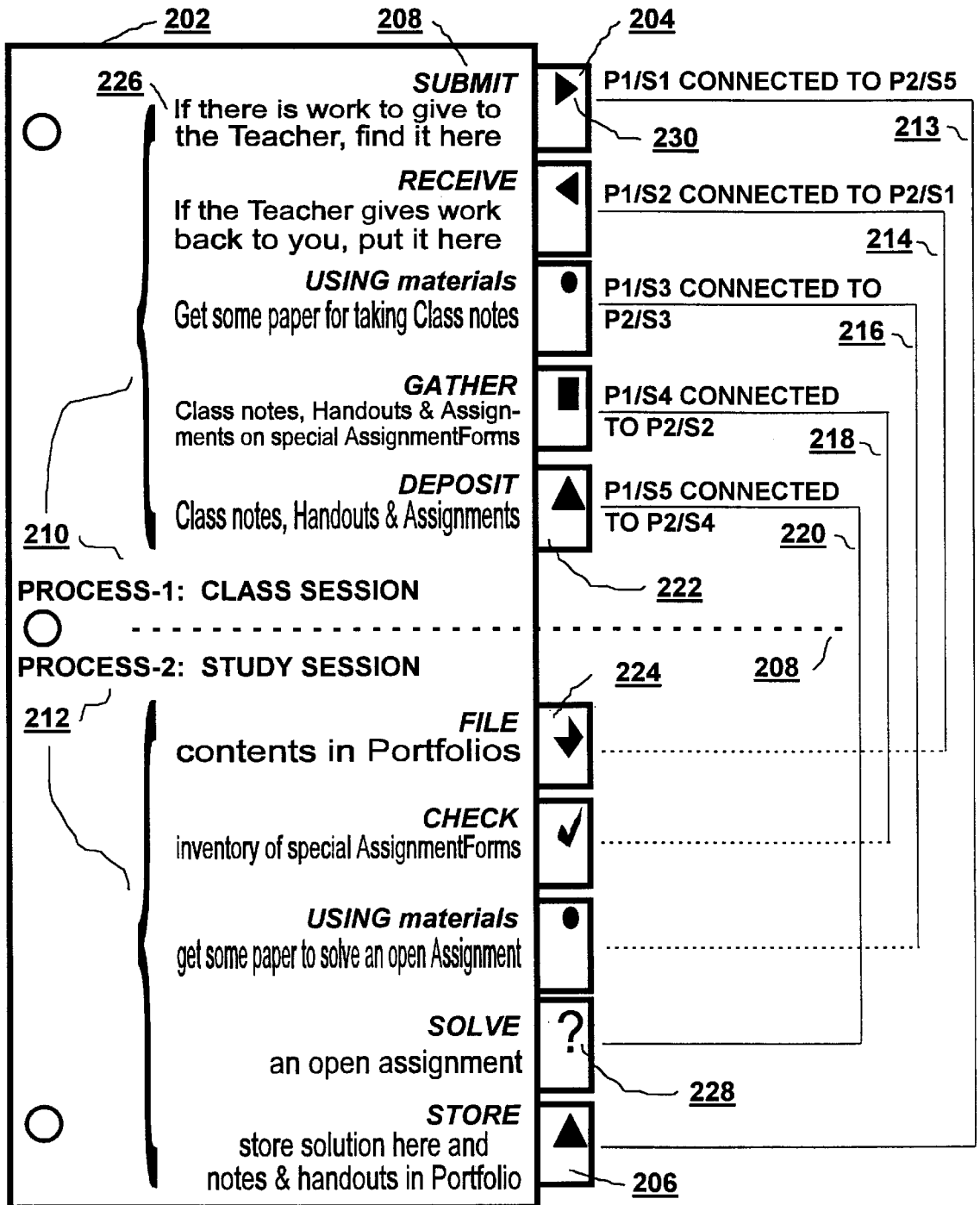
Figure 3:
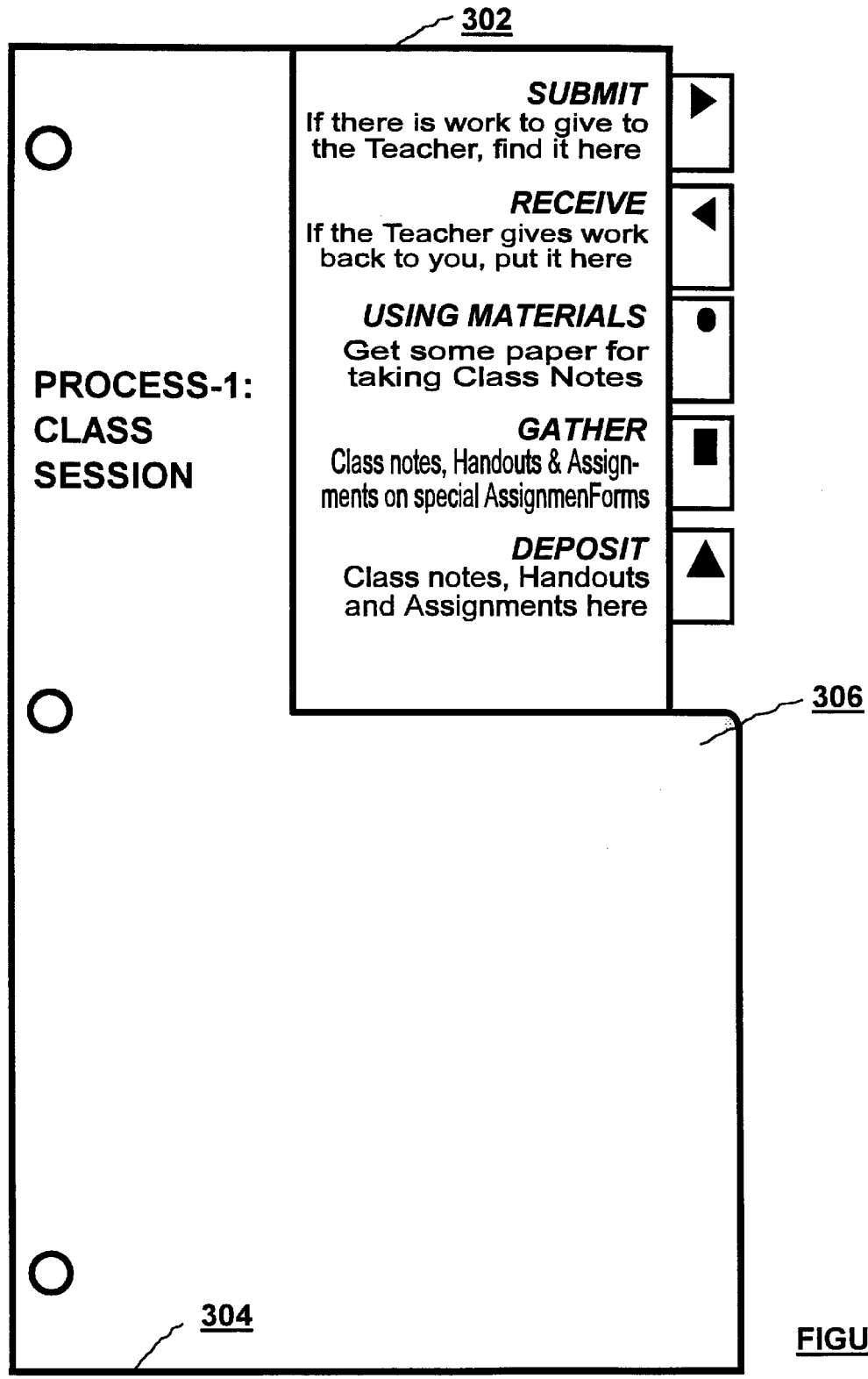
Figure 4:
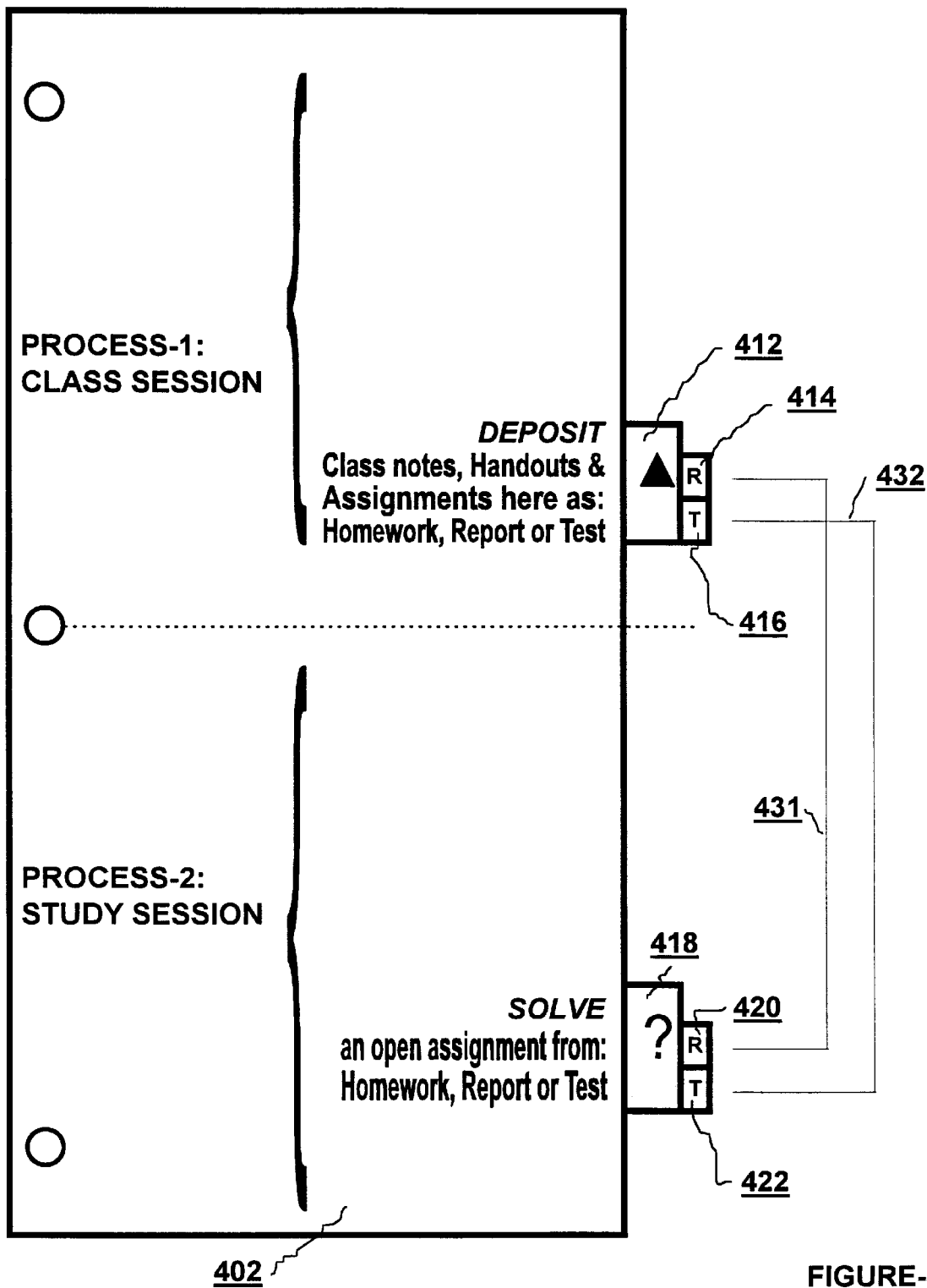
Figure 5:
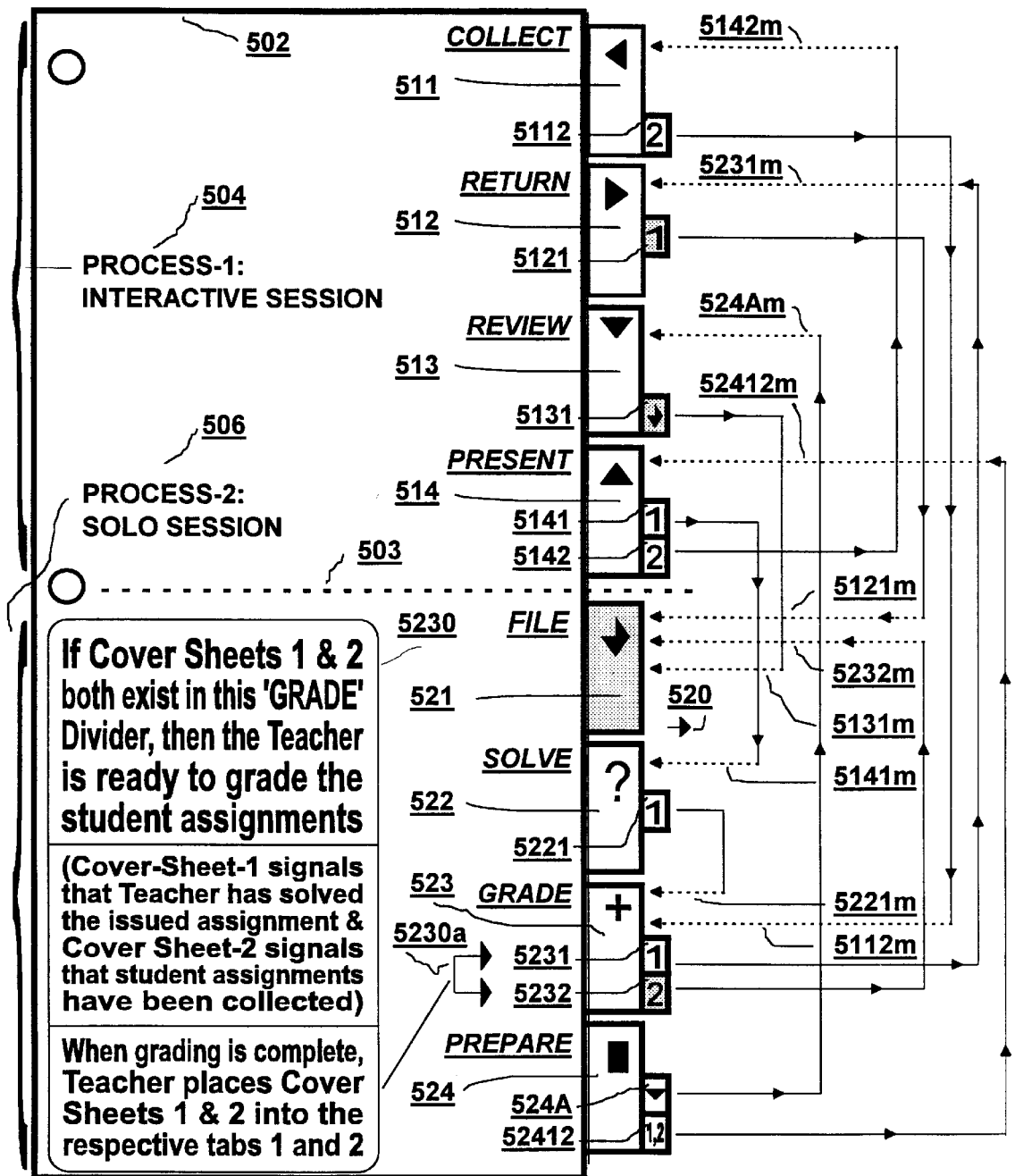
Figure 6:
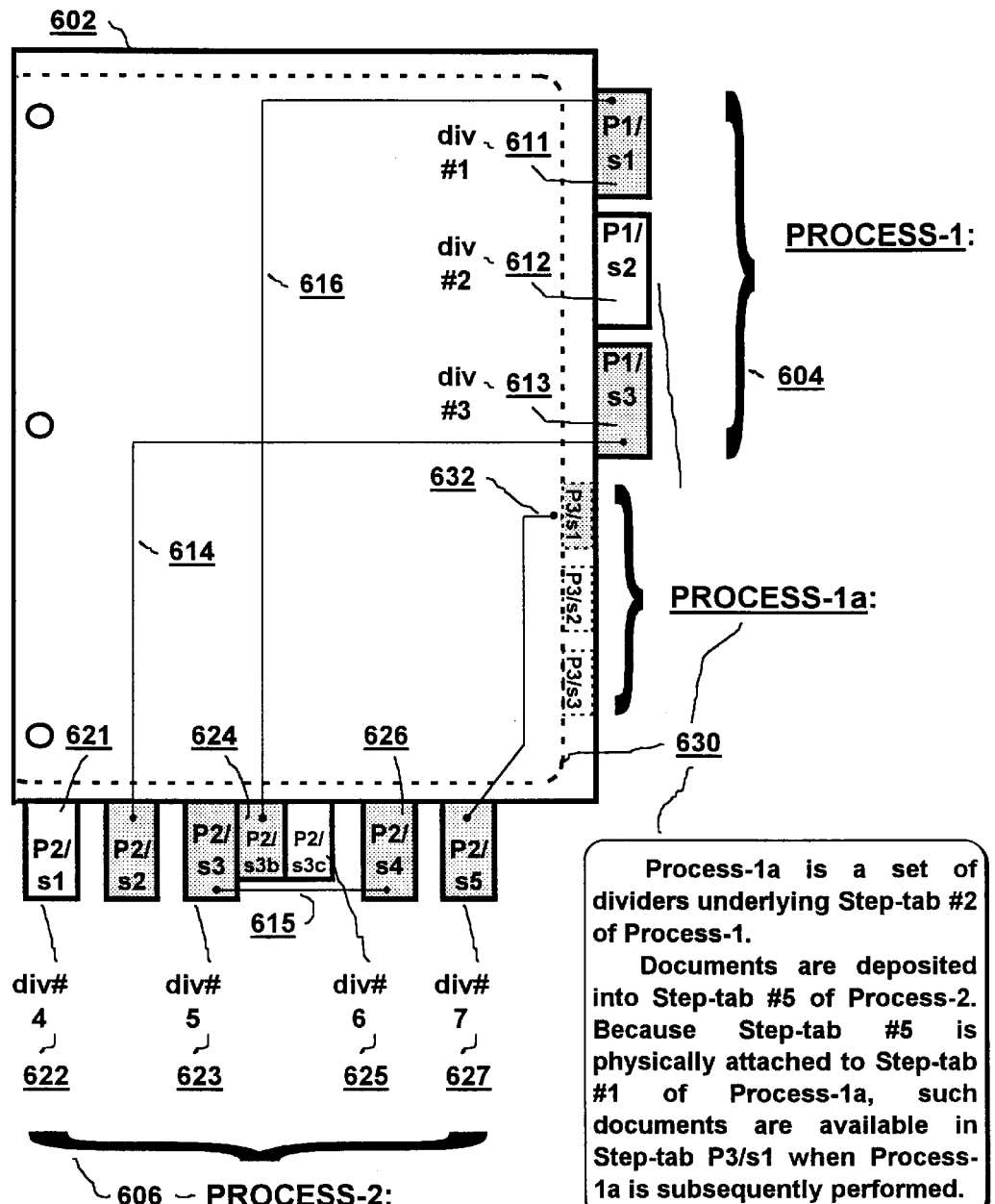
Figure 7:
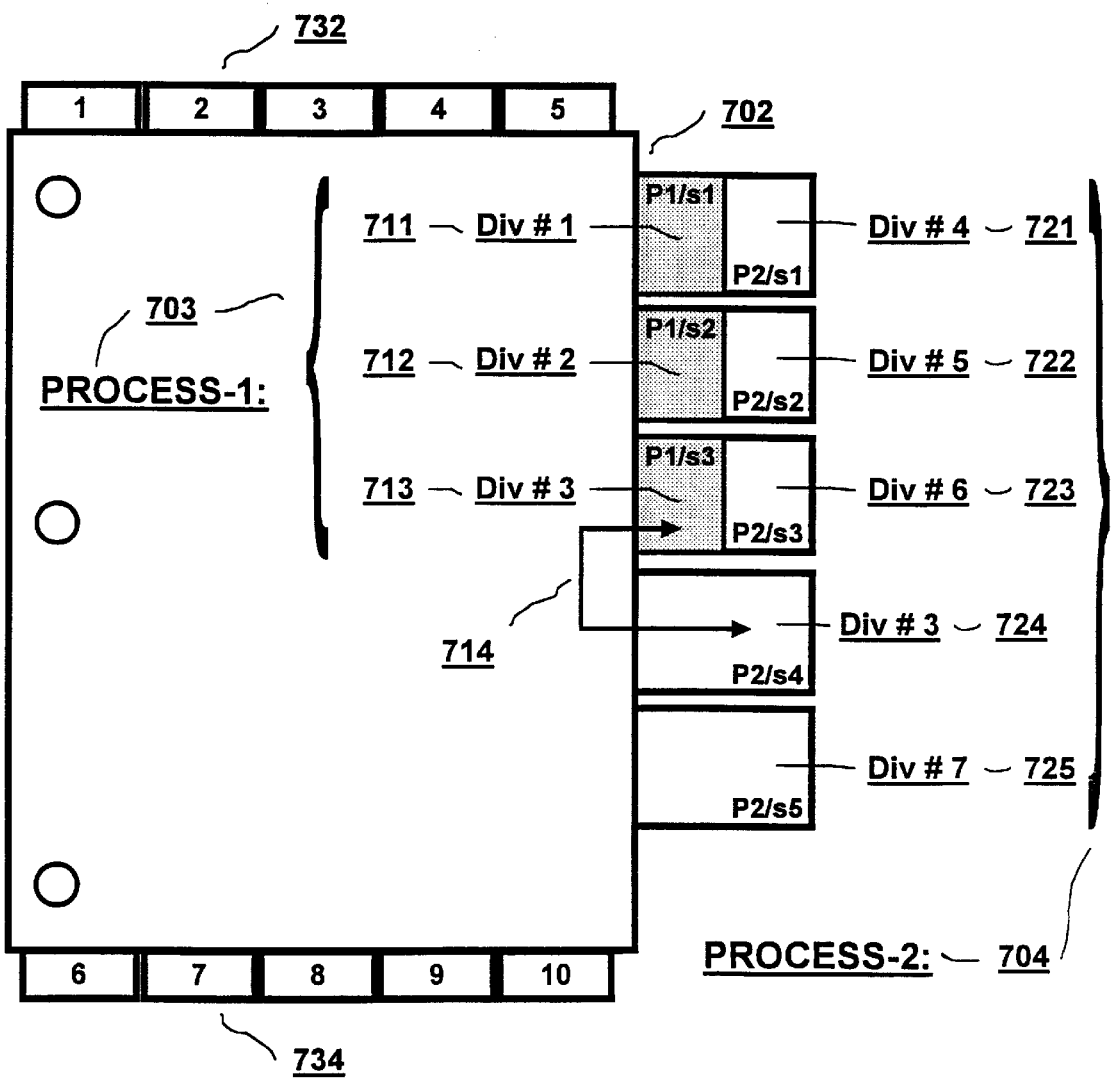

In the drawings, wherein similar reference characters denote similar elements throughout the several views, FIG. 1 illustrates the development of a an organizer having two Process-defining dividers with each divider having two linked steps;

FIG. 2 utilizes the step-linking concepts of FIG. 1. in order to develop the two processes that reflect the document-processing actions of a student during the student's academic day—thereby forming a closed system governing the student's document management processing;

FIG. 3 illustrates a mechanism, for ease of user processing, whereby one or more processes may be made visible to the user, while other processes may be masked from user view when not in use;

FIG. 4 illustrates that visible sub-Tabs may be introduced for finer document categorization;

FIG. 5 illustrates the two processes governing the document-processing actions of a teacher during a teacher's academic day, wherein it is shown that complex processes may be developed using this invention to include decision-making step linkages;

FIG. 6 illustrates that: 1) the tabs of process steps may reside along multiple edges of a divider-set, 2) a process may include linked and non-lined process tabs and 3) a step of a process may lead a user to an underlying process with its own linked steps;

FIG. 7 illustrates that multiple processes may exists "side-by-side" on one edge of a divider set using differing extension lengths for the process tabs of the processes.

Figure 8:
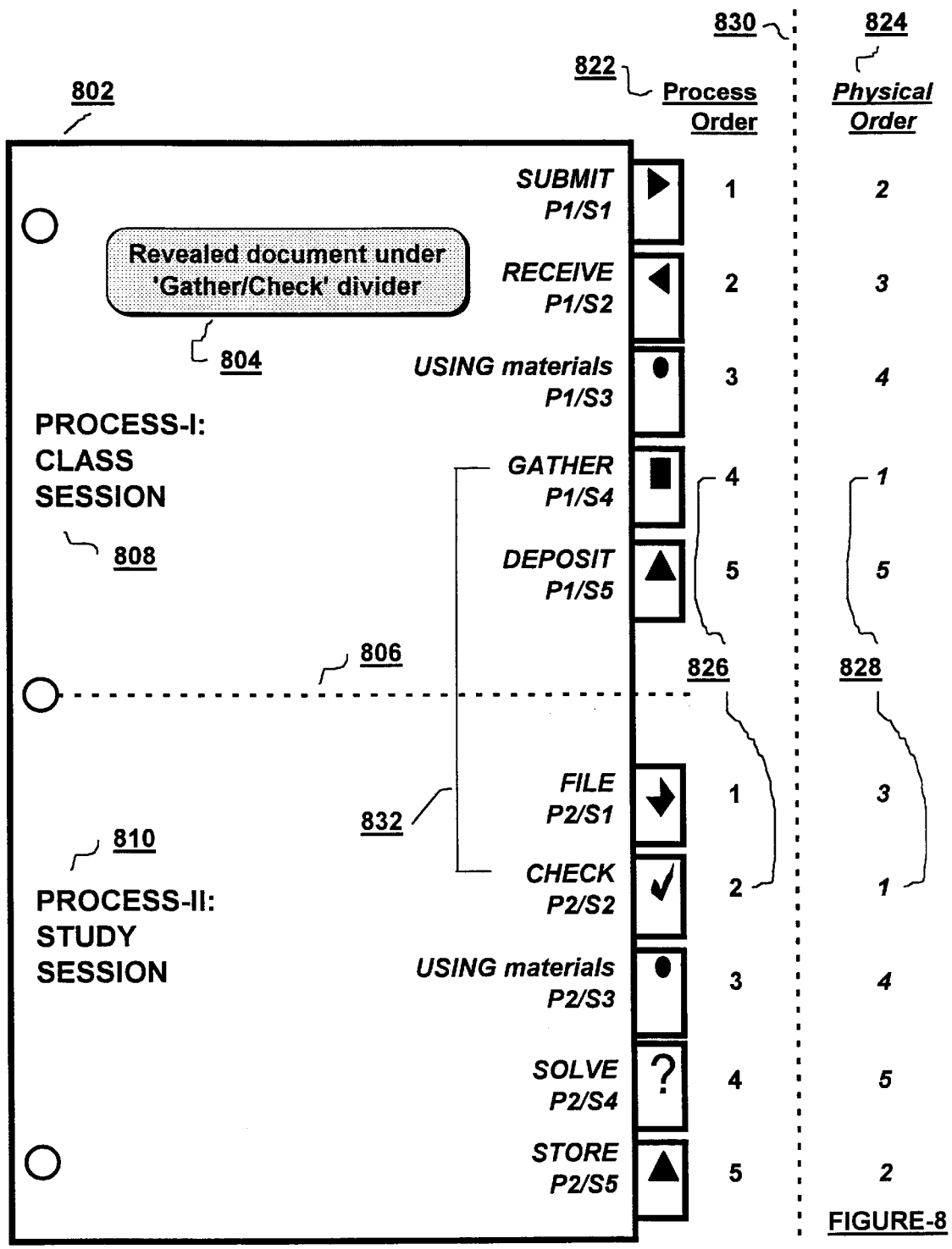

Finally, FIG. 8, illustrates that there exists a mechanism to reveal a document that resides in a divider other than the first divider in an organizer.

DETAILED DESCRIPTION OF THE PREFERRED EMBODIMENT

Referring now in detail to the drawings and, in particular to FIG. 1, wherein two steps of two related processes that govern the document-processing activities of a student's academic day are developed. The first Process is 'Process1:Class-session'. The second Process is 'Process2:'Study-session'. Drawing-element/102 is an empty organizer, taking the form of a standard ring binder. It contains two dividers which define the two aforementioned processes. In drawing-element/104, a standard divider is shown. Its purpose, as with all dividers in divider-applications, is to separate one collection of documents from another. In drawing-element/106, we identify the divider with a tab (drawing-element/106A). In drawing-element/108, the divider is logically divided into two process areas located about an imaginary horizontal line (drawing-element/108a). Above the imaginary horizontal line is Process1:Class-session (drawing-element/108b). Below the imaginary horizontal line is Process2:Study session (drawing-element/108c). In drawing-element/108d, an action-verb ('SUBMIT') is assigned to the tab—thereby converting the tab from merely a labeling mechanism on a divider to a step in a process or a process tab; Step 1 of Process1:Class-session or Step1-1 for short. Drawing-element/110 is the same divider as that shown in drawing-element/108, except that it has been expanded to include another step ('STORE'); namely the fifth step of Process2:Study-session, or Step2-5 for short. (drawing-element/110a). Because, the two introduced steps, Step1-1 and Step2-5, reside on the same, they are viewed as "linked" (drawing-element/110b). Altering the document content during one of the aforementioned steps belong to the two aforementioned processes automatically leaves the documents in the altered state when accessed during the linked step of the other process.

Drawing-element/112 represents a second divider. As with the first introduced divider (drawing-element/108), it is logically divided into two parts about an imaginary horizontal line (drawing-element/112a) in order to establish discrete locations for the steps of the two processes associated with the documents contained within this divider. The second step of Process1:Class-session is 'RECEIVE' and is introduced with drawing-element/112b. Its shorthand is Step1-2. In drawing-element/114, Step 1 of Process2:Study-session is introduced onto the same divider as Step1-2 and entitled 'FILE' (drawing-element/114a). As with the steps of the first divider discussed above (drawing-element/110), the steps of this second divider (drawing-element/114) are physically linked by virtue of the fact that they both reside on the same divider, the linkage represented by drawing-element/114b. Altering any document within either of the two steps identified by divider 2 will leave the document in an altered state when accessed by the other step on divider 2.

Finally, the two dividers are placed one on top of the other in drawing-element/116 to form a set—as they would be in reality when they reside in a ring binder. We clearly see the physical separation of the two processes about the aforementioned imaginary line and the two steps of each process. Documents that the student places into the 'STORE' tab during Step 5 of Process2:Study-session is readily available for submission from the "SUBMIT" tab during Step1-1 of Process1:Class, because Step1-1 is linked to Step2-5—the linkage denoted by drawing-element/116a as developed by drawing-element/110. Similarly, documents that the student receives back from a teacher and places in the "RECEIVE" tab (Step 2 of Process1:Class-session) will be available for filing during Step2-1 of the student's Process2:Study-session, because Step1-2 is linked to Step2-1—the linkage denoted by drawing-element/116b as developed by drawing-element/114. Thus a portion of two linked processes has been developed. The full processes will be developed next during the discussion of FIG. 2.

Referring now to FIG. 2, is illustrated the full development of the two processes which form a closed document management processing system that governs the documents-processing activities of a student's academic day—thereby fleshing out the step linkage and Process1nterrelationship-building as begun in FIG. 1. Drawing-element/202 refers to a set of five dividers. The five dividers, when taken as a whole, define the two processes. Each divider has a pair of tabs (drawing-elements/204&206 for divider #1), where each tab represents a step in a process. There is a placement of tabs such that one can visibly discern groups of tabs—separated by an imaginary line (drawing-element/208). If a step lies above the imaginary horizontal, then such step belongs to Process1:Class-session (drawing-element/210) and is performed in the order corresponding to its position in the plurality of steps lying above the imaginary line. Similarly, if a step lies below an imaginary horizontal line (drawing-element/208), then such step belongs to Process2:Study-session (drawing-element/212) and is performed in the order corresponding to its position in the plurality of steps lying below the imaginary line. Further, because each divider has a pair of steps on it, such steps are defined as being linked (drawing-elements/204&206), although the processing order of a linked step is independent and related to the step's corresponding position within the plurality of steps of the process area in which it is located. Drawing-elements/213,214,216,218,220 illustrate the linkages among the five pairs of steps that define the two processes under discussion.

In terms of the governing processes, Process1:Class-session is defined by a one sentence directive; "Submit & receive; using documents, gather & deposit!". 'Submit' (drawing-element/204 is the first step of Process1, with the steps proceeding in consecutive order and ending with the last step, Step1-5:Deposit (drawing-element/222). A one sentence directive defines Process2:Study-session; "File & check; using documents, solve & store!" 'file' (drawing-element/224) is the first step of Process2, with the steps proceeding in consecutive order and ending with the last step, Step2-5:Store (drawing-element/206).

Steps may be labeled in several ways. The conventional means is to label a divider's tab with a name that indicates what is contained within the divider. However, because this invention utilizes such tabs as defining steps within a process, it is not practical to place all the words of a step's directives on a small tab. Rather, it is more convenient to place all of the directives of all steps on a conventional label that may be placed on its own untabbed divider and reside at the front of all dividers, taking the form of a Label-card. Drawing-element/226 is one element of the overall descriptive label and provides a description of what the action-verb 'SUBMIT' means. Another possibility is to place a Label-card attached to the back cover of the organizer, which protrudes past the horizontal width of the divider set and thereby visibly describes processes. Drawing-element/228 illustrates how a symbol or icon is utilized to provide a meaningful shorthand for a step's description. In fact, in practical usage, the full, literal descriptions fade into the background or may be removed completely—leaving only the icons to drive the processes. The "?" of drawing-element/228 quickly substitutes for the associated literal description and comes to symbolize the area where a student finds all open assignments.

The Label-card may conveniently be configured with a plastic sleeve so that labeling nomenclature may be custom tailored to the needs of a user. Such a plastic sleeve also promotes the use of the organizer and methodology to be language-independent so that by merely interchanging an inserted paper label, a user can render the organizer into a different language—thus allowing for broad country-independent usage.

Process tabs may be also meaningfully colored-coded for additional user-friendliness; paper is found in the 'Using documents' step of either process and may be color-coded as white to provide a convenient shorthand. In fact, some applications of this invention may actually form the contour of the process tab into a shape that bespeaks of the action to be taken during the step. For example, during Step1-1:Submit, documents are located and turned into the teacher for grading. The tab associated with the action of submitting, in addition to of replacement of the 'right arrow icon depicted (drawing-element/230) may have the tab contoured into the shape of an open hand pointing to the right—thereby making the action pictorial in nature.

Referring now to FIG. 3, the set of five dividers is displayed (drawing-element/302) representing the two processes that govern the document-processing activities of a student's academic day—as developed in FIG. 2. In addition, there is a Masking-card (drawing-element/304) with one large vertical tab (drawing-element/306). The purpose of the large vertical tab (drawing element/306) is (at user discretion) to block from view Process2:Study-session; including both its nomenclature and actual process tabs. The illustration specifically refers to the view occurring during a student's classes, when Process1:Class-session controls the student's document-processing activities, and the student wishes to block from view the entire Process2:Study-session process tabs and their nomenclature. Conversely, during Process2:Study-session, the student 1) removes the Masking-card (drawing-element/304) from the organizer, 2) flips it about an imaginary horizontal axis line and 3) replaces it in the organizer. Because the Masking-card is symmetrical about the horizontal axis line, it will now cause the upper right hand portion of underlying dividers to be blocked from view—thereby blocking Process1:Class-session from the student's view and revealing the process tabs and nomenclature of the Process2:Study-session. The Masking-card (drawing-element/304) is a device optionally used in order to reduce the density of elements in the users line of sight—thereby promoting a focus on a current process or processes at a point in time while masking the other processes within the collection of processes. With this same principle, a user may choose to always have the nomenclature or descriptions of all steps revealed, while optionally masking the tabs associated with the steps. This can easily be accomplished by placing the Masking-card after the Labeling-card.

Referring now to FIG. 4, the set of five dividers heretofore illustrated in FIG. 3 is displayed (drawing-element/402) and represents the two processes that govern the paper-processing activities of a student's academic day—as developed in FIG. 3. It is sometimes desirable to introduce finer categorizations for documents that move among steps. Step5:Deposit (drawing-element/412) is the step in which a student deposits documents gathered during a previous step. Rather than a wholesale placement of all "Gathered" documents in Step5:Deposit, in this invention implementation the student chooses to introduce sub-tabs (drawing-elements/414,416)—whereby the student now has discrete locations in which to deposit Report assignments (drawing-element/414) and Tests (drawing-element/416), while having drawing-element/412 available for the storage of Homework assignments (which represents the preponderance of assignments and hence occupies the "main" tab of the step). Just as it was shown previously in FIG. 3 that Process1:Class-session/Step5:Deposit (drawing-element/412) is chosen to be physically linked to Process2:Study-session/Step4:Solve (drawing-element/418), so then is the drawing-element/414 chosen to be physically linked to drawing-element/420 along the linkage pathway represented by drawing-element/431) —so that a Report assignment that is deposited into the "Report" tab (drawing-element/414) surfaces as a Report assignment to be solved during the Process2:Study-session/Step4:Solve (drawing-element/420). The same correlation holds for the Test process tabs (drawing-elements 416,422) along the linkage pathway represented by drawing-element/432.

Referring now to FIG. 5, the application of the invention to the systematization of the document-processing activities of a teacher's academic day are illustrated. The organizer medium chosen is a standard ring binder with a tabbed divider set (drawing-element/502). The two identified processes, both comprised of steps identified by corresponding tabs extending off such dividers of the divider set, are Process1:Interactive-session (a class for example: drawing-element/504) and Process2:Solo-session (grading papers and preparing new lectures, for example: drawing-element/506). Further, the two processes are distinguished from each other by an imaginary line on the divider set (drawing-element/503). Each step of Process1 is located in a discrete grouping along the right side of the upper half of a given divider in the set of dividers and each step of Process2 is discretely located in a discrete grouping along the right side of the lower half of a given divider in the set of dividers.

Each Process is comprised of a collection of steps, where the order of steps to be performed by selecting tabs is defined by the vertical tab position among all process tabs of the process, and each step has a major corresponding tab and possibly one or more minor tabs. In particular, running through Process1:Interactive-session, assume a teacher, a set of students, the teacher teaching one class, and the first day of class; Steps-1 & 2 & 3 (COLLECT:drawing-element/511 & RETURN: drawing-element/512 & REVIEW: drawing-element/513 respectively) are bypassed because there is nothing to collect from, return to or review with the students on the first day of class. In Step4:Present (drawing-element/514), the teacher finds lecture notes and two Cover Sheets (whose purpose will become evident) that were placed there by the Teacher during a class preparatory step the night before (Process2:Solo-session/Step4:Prepare). In order to perform this step, the teacher completes the lecture, issues an assignment, Cover Sheet-1 and accompanying lecture notes in the sub-tab #1 of the step (drawing-element/5141) and finally places Cover Sheet-2 in the sub-tab #2 of the step (drawing-element/5142).

By the concept of tab-linkage, as heretofore discussed in this invention, Process1:Interactive-session/Step4:Present/ sub-tab #1 (drawing-element/5141) is linked or physically attached to the Process2:Solo-session/Step2:Solve (drawing-element/522), and the linkage between the two is represented by drawing-element/5141$m$. The number "5141$m$" nomenclature means that tab 5141 is the source of Cover Sheet-1 and "m" means movement activity. In a similar conceptual manner, Process1:1 nteractive-session/ Step4: Present/sub-tab #2 (drawing-element/5142) is linked or physically attached to the Process1/Step1:Collect (drawing-element/511), and the linkage is represented by drawing-element/5142$m$. The purpose of the Cover Sheet-1 movement is to flag the teacher that the assignment must be solved by the teacher before the teacher can properly grade the student assignment solutions—consider the case of an issued math problem that the teacher must solve before being able to the correct student papers. The purpose of the Cover Sheet-2 movement is to flag the teacher as to when the issued-assignment is to be collected—as per the due-date is recorded on it. When the teacher comes upon each of the Solve and Collect steps, there will be a Cover Sheet present, or a flag, whereby the teacher will know to take an action suggested by the respective Cover Sheet and other documents residing in the respective steps. This document-movement completes Process1:Interactive-session (drawing-element/504).

Assume later in the day, the teacher enters Process2:Solo-session. The teacher begins with Step1:File (drawing-element/521). Which has no contents and is bypassed. Step2:Solve (drawing-element/522) contains Cover Sheet-1, as deposited by Process1:Interact/Step4:(drawing-element/5141). The teacher solves the open assignment and deposits Cover Sheet-1 into sub-tab #1 of the step (drawing-element/5221), which is physically linked to Step3:Grade (drawing-element/523), the linkage of which is represented by drawing-element/5221$m$. The teacher proceeds to Step3:Grade (drawing-element/523). There, the teacher finds Cover Sheet-1, placed there during Process2/ Step2:Solve, according to the linkage represented by drawing-element/5221$m$. The description associated with Step3:Grade (drawing element/5230) states that the teacher may only grade an issued assignment if both Cover Sheets of the assignment exist in Process2:Solo-session/ Step3:Grade tab. The teacher does not find Cover Sheet-2, because the issued assignment has not yet been collected from students because the assignment is not yet due. The teacher proceeds—moving to Step4:Prepare (drawing-element/524). In said Step4:Prepare, the teacher prepares a new lecture and writes the associated student assignment on the Cover Sheets found in the step and completes the step by depositing all of the generated documents into the sub-tab of the step (drawing-element/52412). By this action, the generated documents are reflected in Process1:Interactive-session/Step4:Present due to the step linkage, as represented by drawing-element/52412$m$.

It is now the next time the class meets. The teacher starts at Process1:Interactive-session/Step1:Collect (drawing-element/511). In the tab of the step, the teacher finds Cover Sheet-2 of the previously-issued assignment—having arrived there indirectly as a result of the Cover Sheet-2 sub-tab linkage that governed its document-movement (drawing-element/5142$m$—performed during the previous class meeting's Step4:Present, as discussed above. The teacher compares the Cover Sheet-2 assignment due-date to the current date and determines that the assignment is due to be collected. The teacher collects the completed student assignments and places the collected documents in some external collection device, after recording a teacher-defined marking on the collected student assignments that tie them back to Cover Sheet-2. The teacher now deposits Cover Sheet-2 in sub-tab #2 of Step1:Collect (drawing-element/ 5112), which is a logical part of the overall Step1:Collect (drawing-element/511). Such Step1:Collect/sub-tab #2 is linked or physically attached to Process2:Solo-session/ Step3:Grade (drawing-element/523) along the linkage pathway represented by drawing-element/5112$m$.

After performing Step1:Collect, the teacher moves to Step2:Return (drawing-element/512) and finds the divider-step empty, meaning that there are no graded student assignments to return. In Step3:Review (drawing-element/513), the teacher may find review documents placed there during Process2:Solo-session/Step4:Prepare, thereby being reminded and having documents to engage in a review of the work covered during previous classes. In Step4:Present, the teacher follows the Present step procedure, as first outlined above—placing the two Cover Sheets associated with the lecture, as well as the lecture notes, into the respective sub-tabs of the step in order to begin the tracking process of the class' newly-issued assignment. This completes the interactive portion of the second class meeting.

Moving to Process2:Solo-session and, as with the Process1:Interactive-session, a teacher performs the steps consecutively as defined by their consecutive positions along the right side of the divider set. Firstly, the teacher performs Step1:File (drawing-element/521)—finding the tab empty. In Step2:Solve (drawing-element/522), the teacher finds the Cover Sheet-1 and lecture notes for the most recent class meeting and begins work on solving the corresponding assignment. However, the teacher doesn't complete the solution and therefore leaves the documents in Step2:Solve, without moving them. It should be noted that the Cover Sheet flagging devices are only moved when a step is performed in its entirety. A driving principle behind the invention is that it is desirable to move documents from tab to tab as the documents move through their life cycles.

Proceeding to Step3:Grade, the teacher finds both matching Cover Sheets 1 and 2, indicating that the associated assignment has been both corrected by the teacher and the completed assignments has been collected from the students. On Cover Sheet-2, there is a cross-reference number which locates the actual collected student assignments in the teacher-defined external storage device. The teacher grades the student assignments and moves Cover Sheet-1 to sub-tab #1 of the step (drawing-element/5231), which is linked to Process1:Interactive-session/Step2: Return (drawing-element/512), along the linkage pathway represented by drawing-element/5231$m$. When Process1/Step2:Return is eventually encountered during the Process1:Interactive-session of the next class, Cover Sheet-1 will serve to flag the teacher that there are graded assignments to be returned. Cover Sheet-2 is moved to sub-tab #2 of the step (drawing-element/5232)—thereby winding up in Process2:Solo-session/Step1:File (drawing-element/521) along the linkage pathway (drawing-element/5232m), where it will be filed into the external archive for the course—thereby alerting the archive that there is an assignment in progress waiting to be returned to the students. The description of Step3:Grade is stated in drawing-element/5230 and its effect is reinforced by drawing-element/5230a.

The teacher moves to Step4:Prepare in order to prepare the next class' lecture. If there are documents from previous classes to review, they are moved to the first sub-tab of the step (drawing-element/524A), where it is linked to Process1:Interactivesession/Step3:Review along the linkage pathway represented by drawing-element/524Am. The life-cycle of our monitored assignment will be completed during the next Process1:Interactive-session/Step2:Return (drawing-element/512), when Cover Sheet-1 will be placed into the sub-tab #1 of the step (drawing-element/5121), where it will thereby move along the linkage pathway represented by drawing-element/5121m, to the Process2:Solo-session/Step1:File (drawing-element/521). The purpose of such Step1:File is to provide an avenue for Cover Sheets, lecture documents and other documents in order that they may move from the organizer to an archival device where they may be indexed and stored (drawing-element/520).

When the teacher performs a step, a teacher finds documents that are pertinent to the performance of the step. Therefore, in the 'Return' step, which has to do with returning graded assignments to students, a teacher would like to find the graded assignments to be returned. However, because we are moving documents through their life-cycles as a part of the processes, it is impractical to retain all graded assignments in the organizer because of storage capacity. However, the invention's process management is not hampered because of possible document-storage excess, because the invention calls for using a symbolic representation of the documents—namely a Cover Sheet which "represents" the documents as they are being processed and which are, in reality, stored in bulk elsewhere and identified with a user-defined cross-referencing scheme.

Referring now to FIG. 6, it is illustrated that 1) process tabs of a process may be located on any edge of a divider, 2) linked and non-linked process tabs may co-exist within the same process and 3) an implementation of the invention may hide a process until it can be revealed by selecting a process tab of a another process. In this Figure, if a process tab resides on the same divider as another process tab, it is known as a "linked" process tab and is distinguished by being shaded.

There is a set of seven dividers (drawing-element/602). Process1(drawing-element/604) comprising three steps. Step1 of Process1resides on divider #1 and has a corresponding tab labeled as P1/s1 (drawing-element/611). Step2 of Process1 resides on divider #2 and has a corresponding tab labeled as P1/s2 (drawing-element/612). Step3 of Process1 resides on divider #3 and has a corresponding tab labeled as P1/s3 (drawing-element/613).

Process2 comprises five steps (drawing-element/606). The steps and its corresponding tabs of Process2 are located along a different edge (bottom edge) of the divider set from those defining Process1 (right edge). Step1 of Process2 resides on divider #4 and has a corresponding tab labeled as P2/s1 (drawing-element/621). Step2 of Process2 resides on divider #3 because it is linked to P1/s3 along the linkage pathway represented by drawing-element/614, and has a corresponding tab labeled as P2/s2 (drawing-element/622). Step3 of Process2 resides on divider #5 and has a corresponding tab labeled as P2/s3 (drawing-element/623). Additionally, there are two sub-steps that, along with P2/s3, that form the entire Step 3 of Process2. The first sub-tab corresponding with Step3/part 1 is labeled as P2/s3b (drawing-element/624) and resides on divider #1 because it is linked to P1/s1 along the linkage pathway represented by drawing-element/616. The second sub-tab corresponding with Step3/part-2 is labeled as P2/s3c (drawing-element/625) and resides on divider #6. Step4 of Process2 resides on divider #5 because it is linked to P2/s3 along the linkage pathway represented by drawing-element/615, and has a corresponding tab labeled as P2/s4 (drawing-element/626). Step5 of Process2 resides on divider #7 and has a corresponding tab labeled as P2/s4 (drawing-element/626). Step5 of Process2 resides on divider #8 and has a corresponding tab labeled as P2/s5 (drawing-element/627).

Illustrating another concept of the invention is the fact that selecting a tab of a step may direct the user to launch an underlying process that is hidden from view until the launching process tab is selected. In this example, selecting the tab of the second step of Process1 (drawing-element/612) directs a user to an underlying process, Process1A (drawing-element/630). In addition, Step 1 (P1A/S1) of the underlying Process1A dividers is physically linked to Step5 of Process2, along the linkage pathway represented by drawing-element/632. Upon selecting Step 1 of the underlying Process1A, the user may find documents that were deposited there by Step5 of Process2 (drawing-element/627) during the previous performance of Process2/Step5. The user performs the remainder of Process1A and, upon exiting, resumes performing Process1/Step2. In this manner, a leveling of process may be achieved with application-defined linkages among process tabs. In this manner, a complex application may be made manageable by "masking" subsidiary processes from view.

Referring now to FIG. 7, it is illustrated that in a certain application of the invention, a user wishes to have two processes "side-by-side" on one edge of divider by extending the process tabs of on of the processes. Moreover, the concept of process tab linkage is achievable. Drawing-element/702 is a set of seven dividers which define two processes. Process1 comprises three steps (drawing-element/703). Divider #1 contains of Process1/Process tab-1, entitled P1/s1 (drawing-element/711); divider #2 contains Process1/Process tab-2, entitled P1/s2 (drawing-element/712); divider #3 contains Process1/Process tab-3, entitled P1/s3 (drawing-element/713).

Process2 comprises five steps (drawing-element/704). Divider #4 contains of Process2/Process tab-1, entitled P2/s1 (drawing-element/721); divider #5 contains Process2/Process tab-2, entitled P2/s2 (drawing-element/722); divider #6 contains Process2/Process tab-3, entitled P2/s3 (drawing-element/723). Process2/Process tab-4 resides on divider #3, along with Process1/Process tab-3. These two process tabs are known as "linked" process tabs and are linked along the linkage pathway represented by drawing-element/714. Documents placed in such linked process tabs during a process are available all other process tabs comprising the linked process tabs. Divider #5 contains Process2/Process tab-5, entitled P2/s5 (drawing-element/725). Process2 process tabs have a longer extension length from the body of their respective dividers and, thereby, are visible simultaneously with Process1 process tabs.

In this example, in addition to the process tabs located along the right-edge of the Process-defining, there may be another set of dividers with tabs that are not part of any process. Such tabbed dividers have the conventional use of only storing documents—not to store documents as part of a process. They are displayed along the top-edge of the dividers, one of which is denoted by drawing-element/732, and along the bottom-edge of the dividers, one of which is denoted by drawing-element/734. An example to support this configuration of dividers in an organizer is the case of a delivery person. As a user of the organizer, the delivery person may use Process1 for morning deliveries and Process2 for afternoon deliveries. Such a delivery person may wish to reserve the top and bottom edges of a divider set in an organizer for conventional, referential, non-process tabs to hold relevant documents by customer; the top-edge may be for customers 1 through 5 and the bottom-edge may be for customers 6 through 10—the right-edge is reserved for the two processes and their corresponding process tabs that govern the delivery activities.

Finally, referring now to FIG. 8, it is illustrated that there exists a mechanism to reveal a document that resides in a divider other than the first divider in the organizer. A step in a Process is selected by a corresponding tab. The tab is a physical part of the divider. The divider has a physical position in the organizer. It is reasonable to say that the tab has a physical order. However, the same tab has an order in which it is processed. It is reasonable to say that tab has a process order that is distinct from its physical order. Drawing-element/830 is an imaginary vertical line that distinguishes the physical processing order (drawing-element/822) from the physical order (drawing-element/824) for each tab. Using the invention's example from FIG. 2, we define the document-processing activities of a student's academic day by the use of tabs representing process steps residing on five dividers, which in turn reside in an organizer.

Process1 is the Class session (drawing-element/808) comprising five steps and Process2 is the Study session (drawing-element/810) comprising five steps. Each process tab has a process order and a physical order. For example, the "Gather" step of Process1 is processed fourth, but resides on a divider which is located first among the set of five dividers. The reason for this reality is follows.

On any given class day, in the Process1:Class-session/Step4:GATHER tab of the organizer, there are documents—each of which corresponds to a student's class for the day and ordered by class occurrence. Such documents are used by a student to gather class topics along with the assignments associated with respective classes. The document is referred to as an "assignment form". The name of the class is pre-printed on the document—"English class" for example. It is advantageous for the class name to be visible so that when the student opens the organizer, the name of the next class will be visible through a revealing window (drawing-element/804) cut into the divider. If the "GATHER" process tab, being the fourth step were to be located as the fourth divider, the intervening documents in process tabs 1 through 3 would block the assignment document from view. The solution advanced by the invention is to place the "GATHER" divider as the first one in the organizer, so that the first of its documents will be visible through the revealing window that is cut into the "GATHER" divider. Drawing-elements/826,828 show that the "GATHER" divider is physically located first in the organizer (for the purpose of document revelation as discussed previously) and logically located fourth with respect to the order in which its associated tab is selected during the Process1 flow.

Following this line of reasoning, there is another process tab, Process2:Study-session/Step2:CHECK. When the student selects such process tab, the student is locating documents residing in Process1/Step4 because both process tabs are physically attached to the same divider along the linkage pathway represented by drawing-element/832. In reality divider #1 is the GATHER/CHECK divider. Moreover, it should be noted that each of the process tabs on the upper-half of the divider set is physically linked to a process tab on the lower-half of the sheet.

The purpose of Process2:Study-session/Step2:CHECK is for the student to have a positive step in order to check for necessary inventory in the organizer, where one inventory item is the desirably-visible assignment form. Therefore, if there are no more assignment forms in the organizer, a message stating such will show through the revealing window, since the message is a static document that resides as the last document under the GATHER/CHECK divider.

In summary, the location of processing process tabs on the dividers is critical because the order of such process tabs defines the processing order of a process. The physical placement of the actual dividers is only important when the satisfaction of a particular requirement is necessary, such as the example of masking an underlying process as discussed in FIG. 6, or the side-by-side requirement of two processes as discussed in FIG. 7, or the "revealing window" case as discussed in this illustration. Except for such situations where one divider may have to be purposely placed ahead of another one., the physical order of a divider in a set of dividers is random.

It should be pointed out that the documents in a process tab may suggest a sub-process. When such documents are moved to a linked process tab during a process, one can consider the sub-process as being relocatable or dynamic in nature. Further, a user may have an actual set of dividers that define the sub-process, and such a divider set itself may be moved (along with its contained documents) to a linked process tab. One may consider the sub-process represented by the set of sub-dividers as being dynamic in nature. This concept and capability is extremely powerful and allows for defining complex interwoven processes that exchange reusable and relocatable sub-processes—depending on the needs of the invention's particular implementation.

Thus ends the discussion of the Figures associated with this Specification. Accordingly, while only several embodiments of the present invention have been shown and described, it is obvious that many changes and modifications may be made thereunto without departing from the spirit and scope of the invention.

What is claimed is:

1. A method of systematizing processes for a user, in which a first process comprises a plurality of steps;

each step has a corresponding tab;

each tab is associated with a leaf means for separating documents the user sequentially performs the steps of the process in a sequence defined by an order of tabs;

a predecessor step is linked by said leaf means to a subsequent step; said leaf means are bound together in a binder means; and performing the predecessor step will affect the subsequent step;

the subsequent step is part of the process, and in which a means for flow-charting the order of tabs, is located on an upper leaf means;

a document step involves a document; and in which the method comprises the step of locating the document with the tab of its step; and moving the document from one tab to a different tab during steps.

2. A method according to claim 1, in which:

there is a second process; and the subsequent step is a step of the second process and is linked to the predecessor step of the first process.

3. A method according to claim 1, in which a document step of the plurality of steps is associable with a document; and in which the method comprises a step of locating the document with the tab of the document step.

4. A method according to claim 3, in which the second process comprises a plurality of steps; and the user performs the steps of the second process in a second sequence defined by a second order of tabs, each of the second tabs corresponding to a step of the second process.

5. A method according to claim 4 in which each of the plurality of steps of the second process corresponds to a step of the first process, and a tab of a step of the second process is physically linked by leaf means to the respective tab of the corresponding step of the first process.

6. A method according to claim 5 in which, in addition to the plurality of steps of the second process, the second process comprises an additional step, which additional step is not physically linked by leaf means to a tab of the first process.

7. A method according to claim 5 in which the sequence of performing the steps of the second process may be different from the sequence of performing the corresponding steps of the first process.

8. A method according to claim 4 in which an n process comprises steps, the steps of the n process each have a tab of n process tabs; and a tab of the n process set of tabs may be physically linked by leaf means to a tab of another process.

9. A method according to claim 3 in which a process involves additional steps suggested by the document.

10. A method according to claim 9 involving moving the document from one tab to a different tab during steps.

11. A method according to claim 2 comprising masking the steps of a process with a shaped sheet means, while performing the steps of another process.

12. A method according to claim 4 comprising masking the steps of the second process with a shaped sheet means while performing the steps of the first process.

13. A method according to claim 12 comprising masking the tabs of the first process with a shaped sheet means while performing the steps of the second process.

14. A method according to claim 13 in which, in addition to the plurality of second process tabs, there is an additional second process tab, which additional second process tab is not physically linked to a tab of the first process.

15. A method according to claim 4 in which the sequence of the second process tabs may be different from the sequence of the respectively linked first process tabs.

16. A method according to claim 1 in which placing a document under a tab of the step makes the document available under a tab of the subsequent step, by linking of the tab to the subsequent tab.

17. A method of systematizing processes for a users, in which:

the process comprises a plurality of steps;

each step has a corresponding tab;

each tab is mounted on a leaf;

each leaf is bound in a binder means;

the user sequentially performs the steps of the process in a sequence defined by an order of tabs, a predecessor step is linked to a subsequent step; and performing the predecessor step will affect the subsequent step;

there is a second process;

a linked step of the second process is linked by a common leaf means to a linked step of the first process;

a document step involves a document; and in which the method comprises the step of locating the document with the tab of its step;

the second process comprises a plurality of steps; and the user performs the steps of the second process in a second sequence defined by a second order of tabs, second tabs correspond to steps of the second process;

some of steps of the second process correspond to steps of the first process, and the tab of the step of the second Process is physically linked by the common leaf means to the respective tab of the corresponding step of the first process;

in addition to the steps of the second process corresponding to the first process, the second process comprises and additional step, which additional step is not physically linked to a tab of the first process;

the sequence of performing the steps of the second process is different from the sequence of performing the corresponding steps of the first process;

an n process comprises steps, the steps of the n process each have a tab of a set of n process tabs; and a tab of the n process set of tabs is physically linked by a leaf means to a tab of another process;

a process involves additional steps suggested by the document;

moving the document from one tab to a different tab during steps;

utilizing a shaped sheet as a means for masking the steps of a process, while performing the steps of another process;

placing a document under a tab of the step makes the document available under a tab of the subsequent step, by linking, by leaf means, of the tab to the subsequent tab;

at least one tab of the process is physically linked by the leaf means to a second tab of the process;

the tabs are further means for defining locations for documents.

18. An organizer comprising:

a plurality of leaf means;

means for binding documents and leaf means;

a plurality of tab means attached to leaf means, for defining and locating documents;

said documents being means for facilitating steps of a process;

a first tab means linked by said leaf means to a second tab means;

as means for associating documents a first step associated with the first tab means; with documents of a second step associated with the second tab means;

a plurality of second process tabs;

a tab of the second process tabs is physically linked by said leaf means to a respective tab means of the first process;

a set of n process tabs, and a tab of the n set of tabs physically linked by said leaf means to a tab of another process.

19. An organizer according to claim 18 in which:

the document comprises means for suggesting additional steps.

20. An organizer according to claim 18 further comprising means for masking the steps of a process, while performing the steps of another process.

21. An organizer according to claim 18, in which a process tab defines a sub-process step comprising a further plurality of sub-steps, each sub-step having a sub-tab, said sub-tab uncovered by the process tab, said process tab comprising means for transferring the sub-process to another tab.

* * * * *